United States Patent
Ishii

[11] Patent Number: 5,960,552
[45] Date of Patent: Oct. 5, 1999

[54] SWING AMOUNT MAGNIFYING MECHANISM

[75] Inventor: Munenori Ishii, Utsunomiya, Japan

[73] Assignee: Mitutoyo Corporation, Kawasaki, Japan

[21] Appl. No.: 08/929,725

[22] Filed: Sep. 15, 1997

[30] Foreign Application Priority Data

Sep. 19, 1996 [JP] Japan .................................. 8-247827

[51] Int. Cl.[6] ...................................................... G01B 3/22
[52] U.S. Cl. ............................................... 33/556; 33/559
[58] Field of Search ........................... 33/501, 501.08, 33/503, 555, 556, 558.04, 558.4, 559, 560, 561, 792, 797; 116/284, 289

[56] References Cited

U.S. PATENT DOCUMENTS

| | | | |
|---|---|---|---|
| 2,129,311 | 9/1938 | Street | 33/559 |
| 2,171,022 | 8/1939 | Brown | 33/559 |
| 2,341,809 | 2/1944 | Pearson | 33/559 |
| 2,898,686 | 8/1959 | Croshier et al. | 33/556 |
| 3,464,118 | 9/1969 | Nagata | 116/284 |
| 3,945,124 | 3/1976 | Jacoby et al. | 33/559 |
| 4,047,305 | 9/1977 | Ratajczyk et al. | 33/559 |
| 5,404,650 | 4/1995 | Lindner | 33/559 |

FOREIGN PATENT DOCUMENTS

| | | | |
|---|---|---|---|
| 57-158666 | 3/1984 | Japan | 33/559 |
| A-6-109401 | 4/1994 | Japan . | |

OTHER PUBLICATIONS

S.K. Lisin et al.: "New micrometers and snap gauges with gear and lever reading devices", Measurement Techniques, vol. 18, No. 5, May 5, 1975, pp. 674–676.

*Primary Examiner*—G. Bradley Bennett
*Attorney, Agent, or Firm*—Oliff & Berridge, PLC

[57] ABSTRACT

A swing amount magnifying mechanism is disclosed, which converts a swing angle S of a first arm 41 pivotally mounted on a first shaft 5 is converted by an adjacent second arm 26 into a swing angle θ. A movable surface 141A which transmits swinging of the first arm 41 to a transmitting pin 28A of the second arm 26 is inclined with respect to a neutral line M. Magnification factor K (θ/S) thus can be stabilized over a side range of the angle θ without being affected by displacement of the transmitting pin 28A in the direction of a neutral line M. Highly accurate swing amount conversion is thus obtainable with a fixed magnification factor without substantial component alteration.

12 Claims, 11 Drawing Sheets

F I G. 2
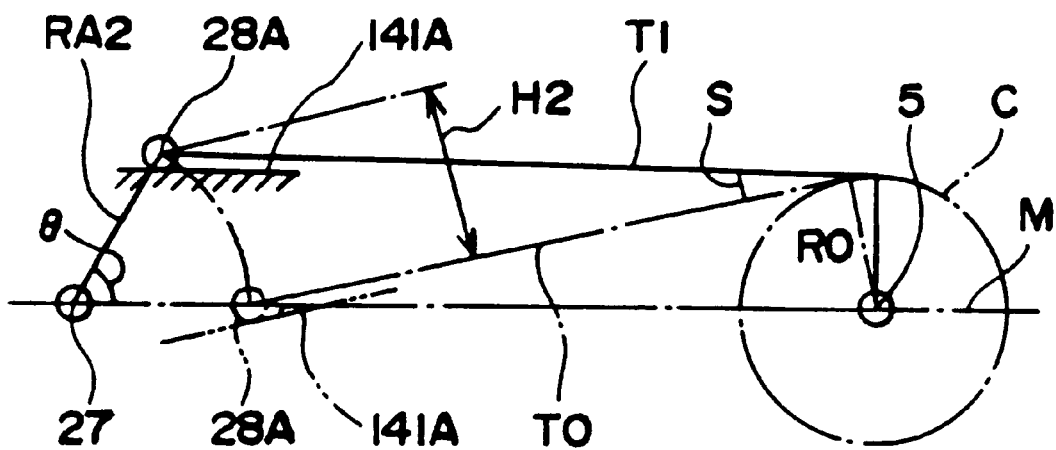

K : MAGNIFICATION FACTOR

F I G. 9
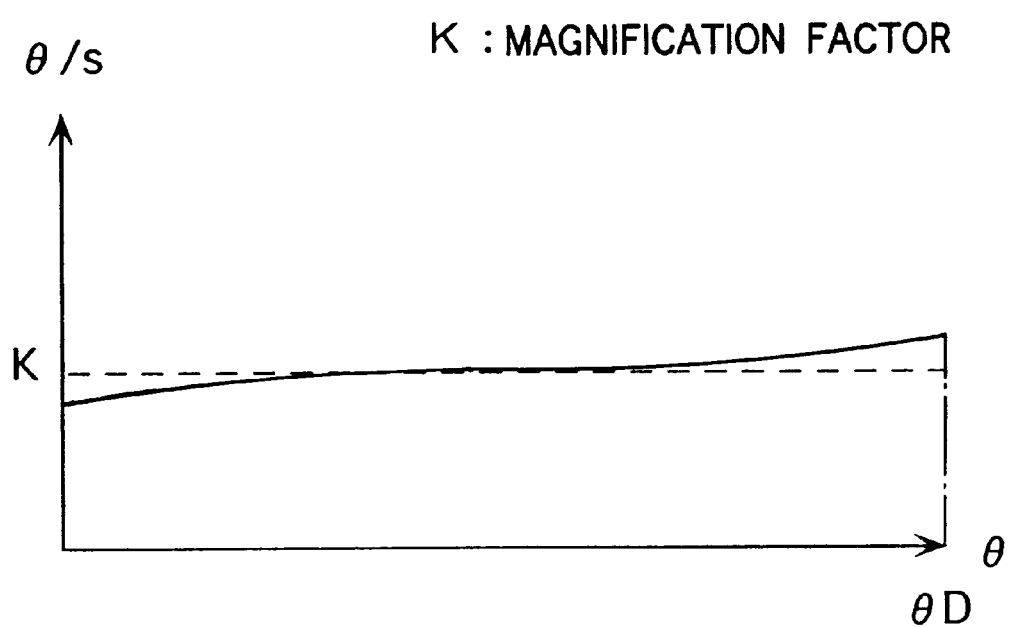

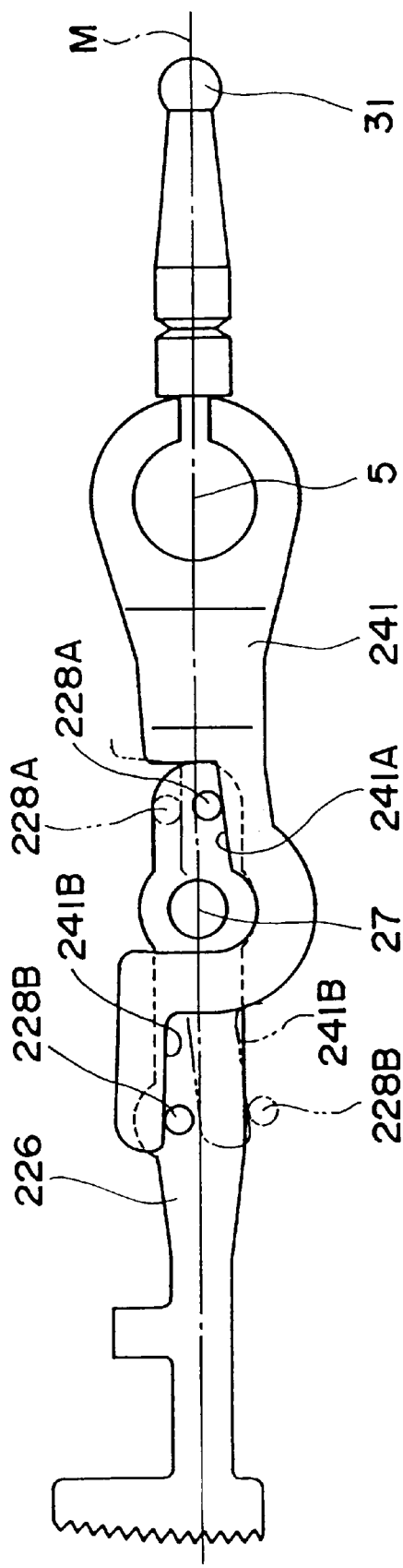
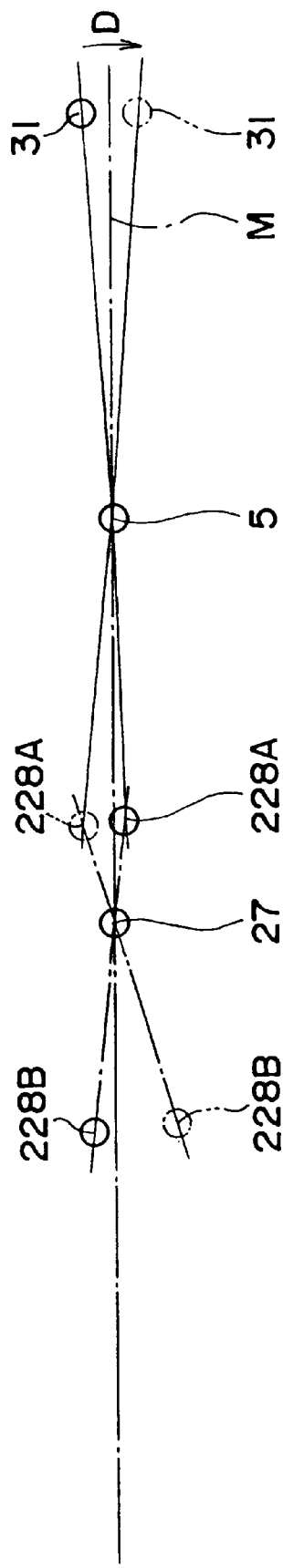
F I G. 10
F I G. 11

SWING AMOUNT MAGNIFYING MECHANISM

BACKGROUND OF THE INVENTION

1. Field of the Invention

This invention relates to a swing amount magnifying mechanism which can be utilized for, for instance, a lever dial gauge for displaying a swing amount of probe as a corresponding rotation amount of a pointer.

2. Description of Related Art

A swing magnifying mechanism is well known in the art, which transmits a swing amount of an arm with a probe provided thereon after magnification conversion through leverage to a different arm, and is utilized for a dial gauge or the like for magnifying a swing amount of a problem into a corresponding rotation amount of a pointer that is displayed.

Such a dial gauge can magnify even a slight swing amount with the magnifying mechanism into a great displacement of the pointer.

Japanese Patent Publication Laid-Open No. 6-109401 discloses a lever dial gauge, which has a construction as shown in FIGS. 13 and 14.

Referring to the Figures, reference numeral 1 designates a dial gauge casing, 51 a cover thereof, 11 a dial unit for displaying the rotation amount of a pointer, 41 a first arm, and 26 a second arm.

The casing 1 has a recess 2, a probe insertion hole 3 communicating therewith and open at one end of it, and a notch 9 formed in one edge wall of it defining the recess 2. The dial unit 11 is mounted in the notch 9.

The casing 12 further has a pair of integral bearing extensions 4A and 4B extending on the opposite sides of the probe insertion hole 3.

The first arm 41 is inserted through the probe insertion hole 3 such that a probe 31 extending from an end of it projects outward. The first arm 41 has a first shaft 5 provided in its intermediate portion and pivotally mounted via bearings 5A and 5B in the bearing extensions 4A and 4B.

The second arm 26 disposed in the recess 2 of the casing 1, can magnify the swing angle of the first arm 41, and has a pinion gear 23 and a crown gear 24 for transmitting the swing amount of the second arm 26 to the dial unit 11.

The second arm 26 is disposed adjacent to the first arm 41, which is inserted through the probe insertion hole 3. The second arm 26 has a second shaft 27 provided in its intermediate portion and pivotally mounted in a bottom portion 1A of the casing 1. The pinion gear 23 and crown gear 24 are mounted as a one-piece member for rotation in a bottom portion 1B of the casing 1.

The first arm 41 has movable surfaces 41A and 41B, which are formed on an inserted portion of the first arm 41 on the side of the first shaft 5 opposite the probe 31 and to be displaced with swinging of the first arm 41.

The second arm 26 has transmitting pins 28A and 28B, which are in contact with the movable surfaces 41A and 41B, respectively, of the first arm 41 and transmit a swing amount of the first arm 41 to the second arm 26. The second arm 26 further has a sector gear 25 provided at one end and in mesh with the pinion gear 23.

The second arm 26 is biased for rotation about the second shaft 27 in the clockwise direction in FIG. 4 by a string spring 29 provided in the recess 2. The movable surfaces 41A and 41B and the transmitting pins 28A and 28B are thus held in contact with one another at all times, i.e., irrespective of whether or not the swing amount measurement is in force.

In the lever dial gauge having the above construction, the mechanism for magnifying a swing amount of the probe 31 into a corresponding rotation amount of the pointer in the dial unit 11, will now be described with reference to FIG. 14.

When the probe 31 is caused to swing in direction U in FIG. 14, the first arm 41 is rotated about the first shaft 5 in the counterclockwise direction in FIG. 14, thus causing the movable surface 41B to be displaced downward in FIG. 14. With the downward displacement of the movable surface 41B, the transmitting pin 28B of the second arm 26 is pushed downward in FIG. 14, thus causing the second arm 26 to be rotated about the second shaft 27 in the counterclockwise direction.

The downward rotation of the second arm 26 is transmitted via the sector gear 25 of the pinion gear 23 to cause clockwise rotation thereof, and is also transmitted via the crown gear 24 to a center pinion 14, which is provided in the dial unit 11, whereby the swing amount is displayed as a corresponding rotation amount of the pointer 16 via a shaft 15.

When the probe 31 is caused to swing in direction D, the first arm 41 is rotated about the first shaft 5 in the clockwise direction in FIG. 14, thus causing this time the movable surface 41A to be displaced upward in FIG. 14. The transmitting pin 28A of the second arm 26 is thus pushed upward in FIG. 14, thus causing the second arm 26 to be rotated about the second shaft 27 in the counterclockwise direction, i.e., in the same direction as in the case of swinging of the probe 31 in the direction U.

In the lever dial gauge of this construction, the pointer 16 is thus rotated in a fixed direction irrespective of the direction of swinging of the probe 31.

In the above swing magnifying mechanism for magnifying a swing amount through leverage, the magnification factor varies with the fulcrum positions of the two levers and the distance between transmission points. The mechanism of magnification will now be described with reference to FIGS. 15 and 16.

FIG. 15 shows the position relation between the first and second arms 41 and 26 in the neutral state, i.e., a state without swinging of the probe 31. In this state, the first and second arms 41 and 26 both extend along a neutral line M connecting the first and second shafts 5 and 27, and the transmitting pins 28A and 28B on the second arm 26 are on the neutral line M.

The transmitting pin 28A is found at a position to internally divide the line segment L between the first and second shafts 5 and 27, that is, it is at distance RA1 from the first shaft 5 and at distance RA2 from the second shaft 27. The transmitting pin 28B is found at a position to externally divide the line segment L, i.e., it is at distance RB1 from the first shaft 5 and at distance RB2 from the second shaft 27. The distances RA1, RA2, RB1 and RB2 are related as RA2<RA1<L and RB2<L<RB1.

FIG. 16 is a simplified showing of FIG. 15, and shows a state when the probe 31 has swung by angle S in direction D.

The swinging of the probe 31 in the direction D causes the first arm 41 to be rotated about the first shaft 5 by angle S in the clockwise direction, thus causing the movable surface 41A of the first arm 41 to push and displace the transmitting pin 28A of the second arm 26 about the second shaft 27 by angle θ in the counterclockwise direction to a position above the neutral line M.

In this state, the swing angle S of the first arm 41 and the swing angle θ of the second arm 26 are related as LA1×sin S=RA2×sin θ.

So long as the angles S and θ are changed very slightly,

Sin θ≈θ
and Sin S≈S.
and thus
LA1×S=RA2×θ
and θ=K×S (K=LA1/RA2)
Since
LA1 (≈RA1)>RA2, the swing angle S of the first arm 41 is converted with magnification factor K into the swing angle θ of the second arm 26.

Although not shown in FIG. 16, we can obtain similar relations with the transmitting pin 28B, which becomes operative when the probe 31 is caused to swing in the direction U opposite to the direction D.

As described above, so long as the swing angles S and θ from the neutral line M are small, the magnification factor K, by which the angle S is converted into the angle θ, is stable and fixed. As the angles S and θ are increased, however, the displacement of the transmitting pin 28A eventually becomes no longer negligible, that is, the magnification factor K is increased with increase of the angle θ.

Particularly, when the transmitting pin 28A which is found at the point of the internal division of the line segment between the first and second shafts 5 and 27 becomes operative, an increase of the swing angle θ results in a great change in the magnification factor K as shown in FIG. 17 because the absolute distances RA2 and RA1 are small.

In order to prevent such great change in the magnification factor K, it has been attempted to improve the accuracy of the swing amount magnifying mechanism by reducing the rate of change in the distance LA1 with a change in the angle θ by setting the distance L between the first and second shafts 5 and 27 to be sufficiently large.

To set the distance L to be sufficiently large, however, dictates increasing the length of the first arm. This means that it is necessary to prepare a plurality of arms in advance for the dial gauge manufacture in dependence on the swing amount range of the probe. This gives rise to the problems of cumbersomeness increase and complication of parts management in manufacture and cost increase of manufacture of the first arm.

Moreover, increasing the length of the first arm dictates correspondingly increasing the sizes of the casing 1, cover 51 and other components of the dial gauge, thus posing the problem of dial gauge size increase and making the problems of the component management complication and manufacturing cost increase more serious.

The invention seeks to overcome the above drawbacks inherent in the prior art, and it has an object of providing a highly accurate swing amount magnifying mechanism with a combination of a plurality of levers, which can convert the swing amount of the probe with a fixed magnification factor without considerable component alteration when the swing amount range is increased.

SUMMARY OF THE INVENTION

A swing amount magnifying mechanism according to the invention comprises a first shaft portion and a second shaft portion, these shaft portions having the axes thereof extending in the same direction, a first arm pivotally mounted on the first shaft portion, and a second arm pivotally mounted on the second shaft portion and disposed adjacent to the first arm, the first or second arm having a movable surface to be displaced with swinging of that arm, the other arm than with the movable surface having a transmitting pin in contact with the movable surface for transmitting swinging of the arm with the movable surface to the other arm, swinging of the first arm causing rotation of the second arm via the transmitting pin, a swing angle of the first arm being magnification converted to be transmitted to the second arm, wherein in an initial state the movable surface is an inclined surface inclined with respect to a neutral line M connecting the first and second shaft portions and gradually further apart from the neutral line as one goes from the first shaft portion to the second shaft portion.

In the prior art, as shown in FIG. 1, the movable surface 41A provided on the first arm is substantially parallel with the neutral Line M, and displacement H1 in a direction perpendicular to the neutral line M is used to derive the relation between the angles S and θ. Therefore, as the swing angle S of the first arm is increased, the transmitting pin 28A is displaced in the direction of the neutral line M and away from the first shaft 5, thus resulting in a conversion error between the angles S and θ.

According to the invention, as shown in FIG. 2, the movable surface 141A of the first arm is inclined with respect to the neutral line M such that it is gradually further spaced apart from the neutral line M as one goes from the first shaft 5 toward the second shaft 27.

Provided that the movable surface 141A is an inclined surface in this way, the swing angle S of the first arm 41 can be grasped as an angle between tangential lines T1 and T0, which are drawn from the initial and displaced positions of the transmitting pin 28A to arc C with radius R0 and with the center constituted by the first shaft 5.

By deriving the relation between the angles S and θ with displacement H2 in a direction perpendicular to the tangential line T0, as is seen from FIG. 2, the displacement of the transmitting pin 28A in the direction of the tangential line T0 is reduced compared to the prior art arrangement. The magnification factor K for converting the angle S into the angle θ is thus stable, thus obtaining accuracy improvement of the swing amount magnifying mechanism.

Since the accuracy improvement of the swing amount magnifying mechanism is obtainable by merely providing the first arm with an inclined movable surface, it is not necessary to alter the second arm and other components, thus permitting simplification of the dial gauge component management and reduction of the cost of manufacture.

Besides, since the inter-axis distance L between the first and second shafts 5 and 27 need not be increased, it is possible to prevent size increase of the dial gauge, standardize the casing, cover and other components of the dial gauge, further simplify the component management, and further reduce the cost of manufacture.

Suitably, the movable surface of the first arm is an inclined surface parallel to the above tangential line (T0, T1) drawn from the arc C of the radius R0 to the transmitting pin 28A, and the radius R0 is determined in dependence on the swing amount range of the first arm.

Once the radius R0 is determined in dependence on the swing amount range of the first arm, the inclination of the movable surface of the first arm is determined by the sole radius R0, thus simplifying the management of the process of the dial gauge manufacture.

Another swing amount magnifying mechanism according to the invention comprises a first shaft portion and a second shaft portion, those shaft portions having the axes thereof extending in the same direction, a first arm pivotally mounted on the first shaft portion, and a second arm pivotally mounted on the second shaft portion and disposed adjacent to the first arm, the first or second arm having a movable surface to be displaced with swinging of that arm, the other arm than that with the movable surface having a transmitting pin in contact with the movable surface for transmitting swinging of the arm with the movable surface to the other arm, swinging of the first arm causing rotation of the second arm via the transmitting pin, a swing angle of the first arm being magnification converted to be transmitted to the second arm, wherein when the first and second arms are found on a neutral line connecting the first and second shaft portions, the transmitting pin is found at a position deviated from the neutral line.

With the transmitting pin in such a position, the neighborhood of the normal to the neutral line M is set as the range of the swing angle θ of the second arm. Thus, the displacement of the transmitting pin 28A in the direction of the neutral axis M is reduced, and the magnification factor K is not greatly changed.

Thus, it is possible to obtain accuracy improvement of the swing amount magnifying mechanism, eliminate the need of altering the inter-axial distance between the first and second arms, prevent size increase of the dial gauge, standardize the casing, cover and other components of the casing, simplify the component management, and reduce the cost of manufacture.

BRIEF DESCRIPTION OF THE DRAWINGS

FIG. 2 is a schematic view showing the function of a swing amount magnifying mechanism according to the invention;

FIG. 9 is a graph showing the relation between swing angle θ of a second arm and magnification factor K in the second embodiment;

FIG. 10 is a schematic view showing the combination of a first arm and a second arm in a third embodiment of the swing amount magnifying mechanism according to the invention;

FIG. 11 is a schematic view illustrating displacements of movable surfaces and transmitting pins shown in FIG. 10;

DETAILED DESCRIPTION OF THE PREFERRED EMBODIMENT(S)

Figure 1:
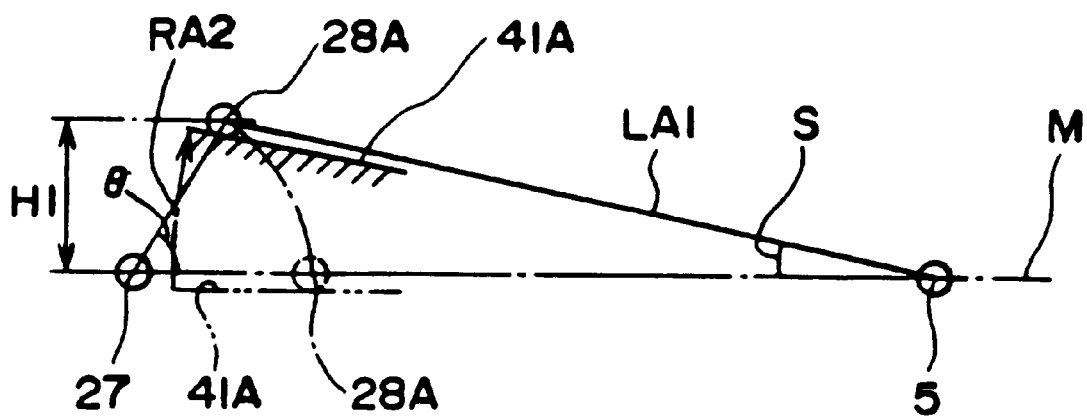
FIG. 1 is a schematic view illustrating the function of a prior art swing amount magnifying mechanism.

A first embodiment of the invention will now be described with reference to drawings. Parts described before and parts like or similar to those described before are designated by like reference numerals and symbols, and are not described.

Figure 3:
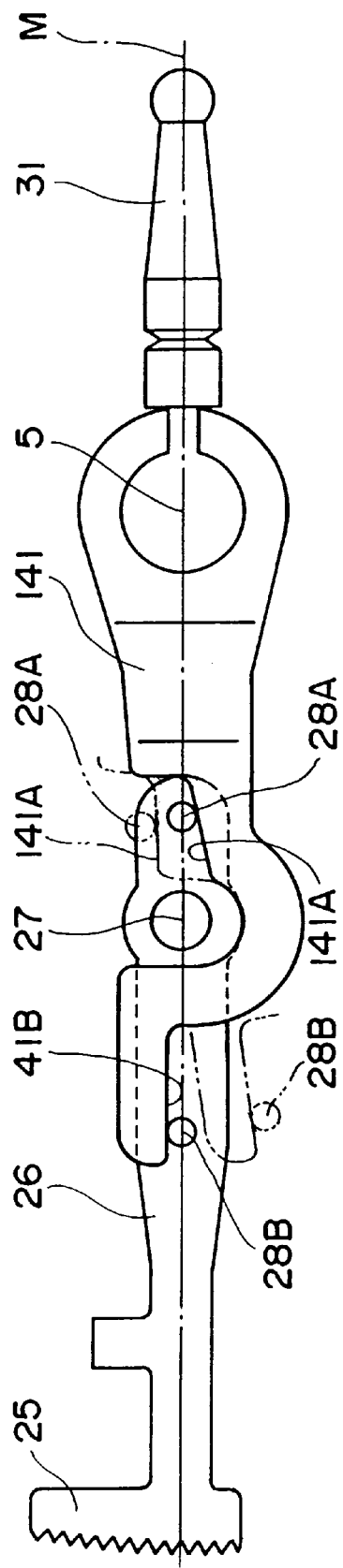
FIG. 3 is a schematic view showing the combination of a first arm and a second arm in a first embodiment of the swing amount magnifying mechanism according to the invention.
Figure 4:
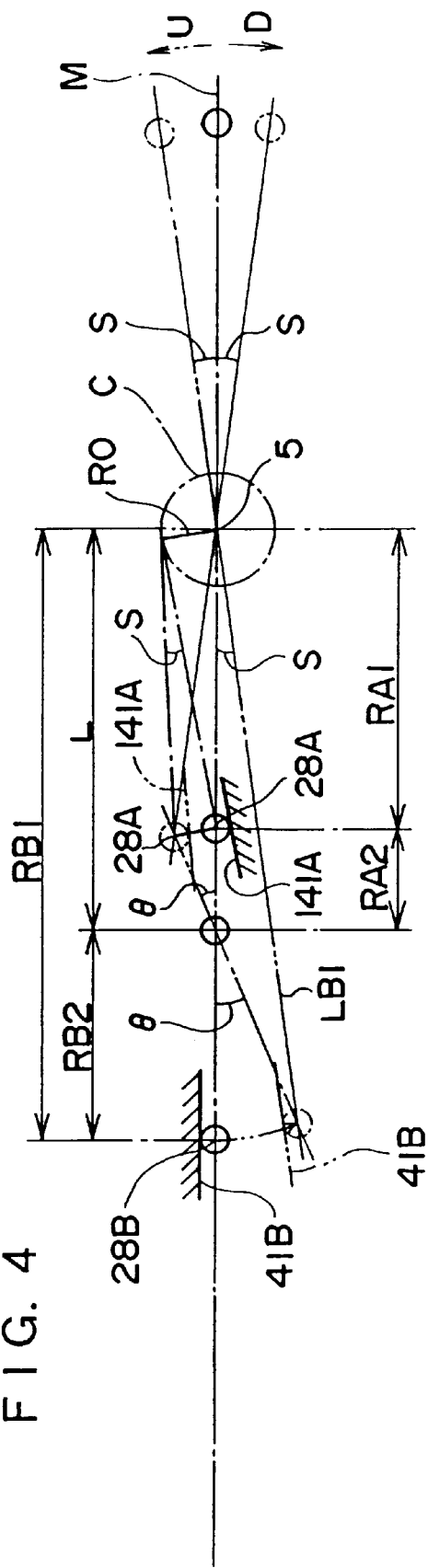
FIG. 4 is a schematic view illustrating displacements of movable surfaces and transmitting pins shown in FIG. 3.
Figure 15:
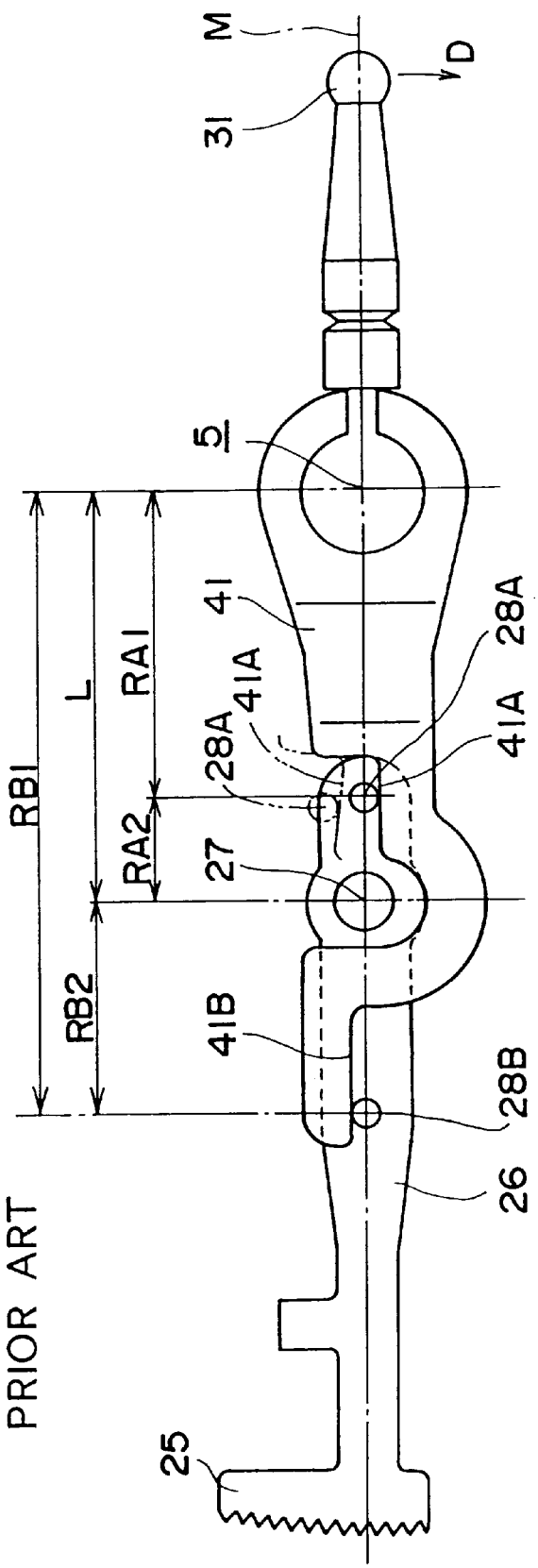
FIG. 15 is a schematic view showing the combination of a fist arm and a second arm in the prior art swing amount magnifying mechanism.
Figure 16:
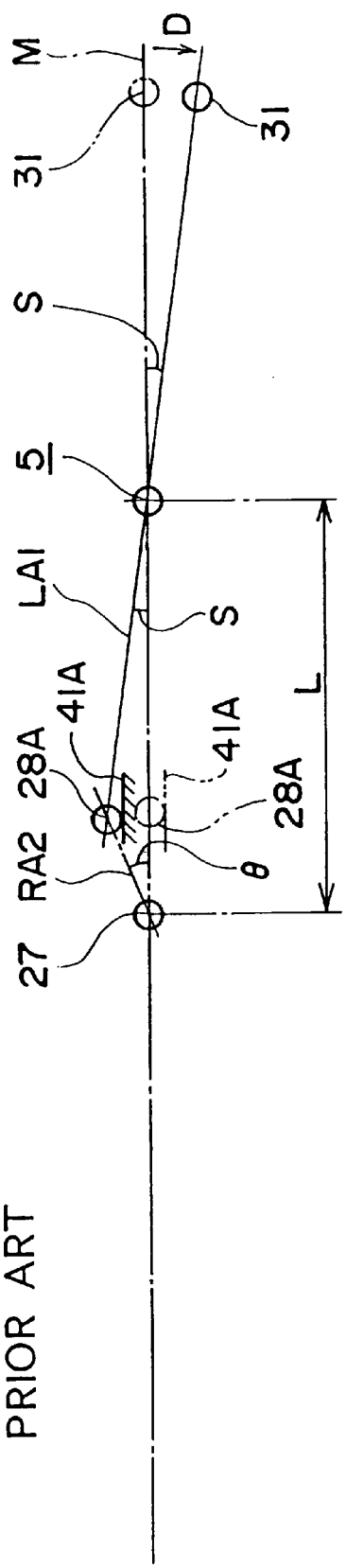
FIG. 16 is a schematic view showing displacements of movable surfaces and transmitting pins shown in FIG. 15.

FIGS. 3 and 4 are similar to FIGS. 15 and 16, respectively, but show the first embodiment of the swing amount magnifying mechanism according to the invention.

This embodiment is different from the prior art swing amount magnifying mechanism described before in that unlike the prior art mechanism, in which the movable surface 41A of the first arm 1 is substantially parallel to the neutral line M, in this embodiment the movable surface 141A of the first arm 141 is an inclined surface, which is inclined with respect to the neutral line M such that it is gradually further apart from the neutral line M as one goes from the first shaft 5 toward the second shaft 27, In the neutral state of the first arm 141, the movable surface 141A has an inclination parallel to a tangential line T0, which is drawn from the axis of the transmitting pin 28A to an arc C of a radius R0 with the center thereof constituted by the first shaft 5. The radius R0 is determined by the sole swing amount range of the first arm 141.

The function of the first embodiment will now be described.

Figure 13:
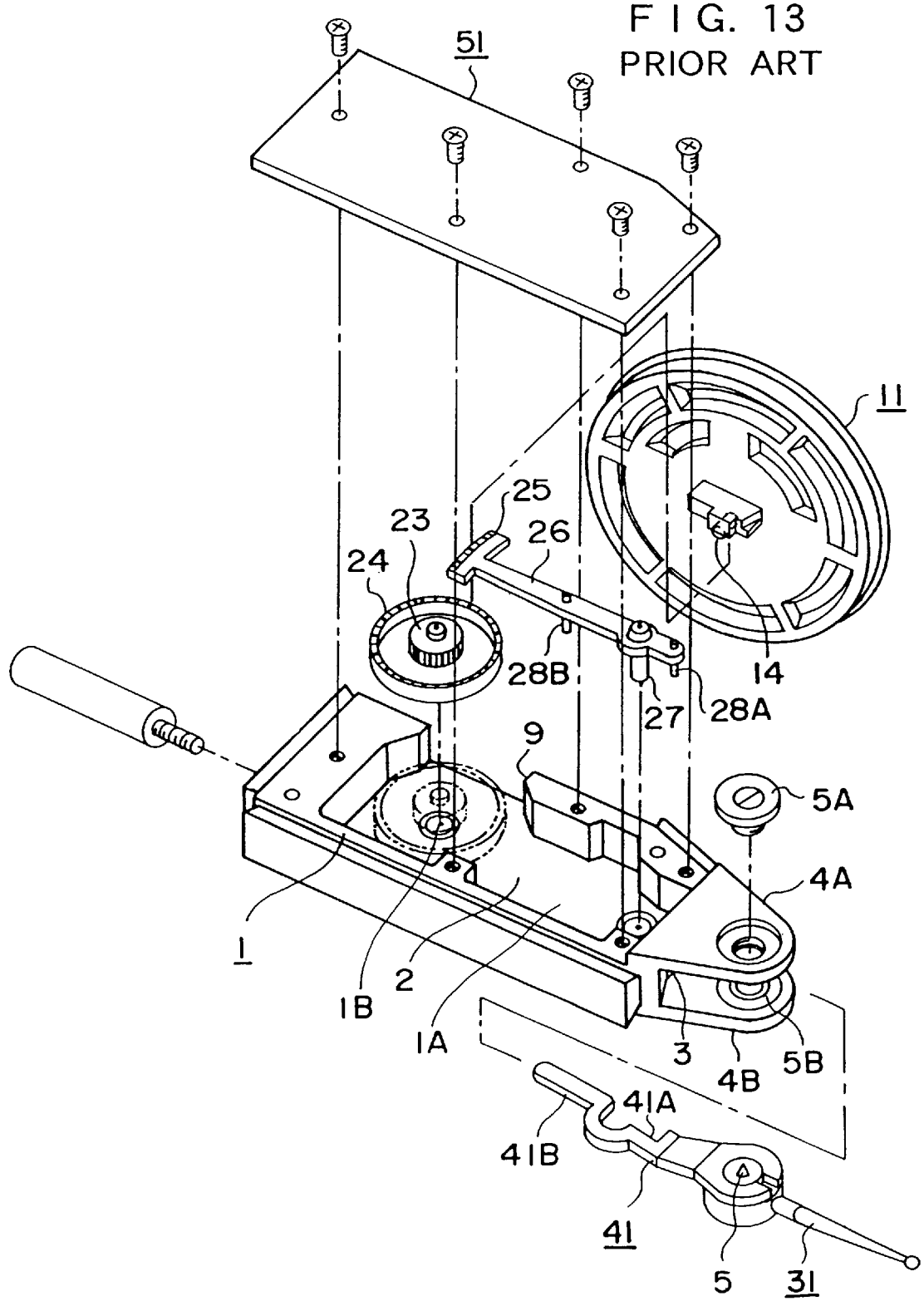
FIG. 13 is an exploded perspective view showing a lever dial gauge with a prior art swing amount magnifying mechanism.

When the probe 31 is caused to swing in direction D in FIG. 3, the movable surface 141A on the side of the first shaft 5 opposite the probe 31 is displaced to a position above the neutral line M in FIG. 13. As a result, the transmitting pin 28A of the second arm 26 is pushed upward.

Figure 5:
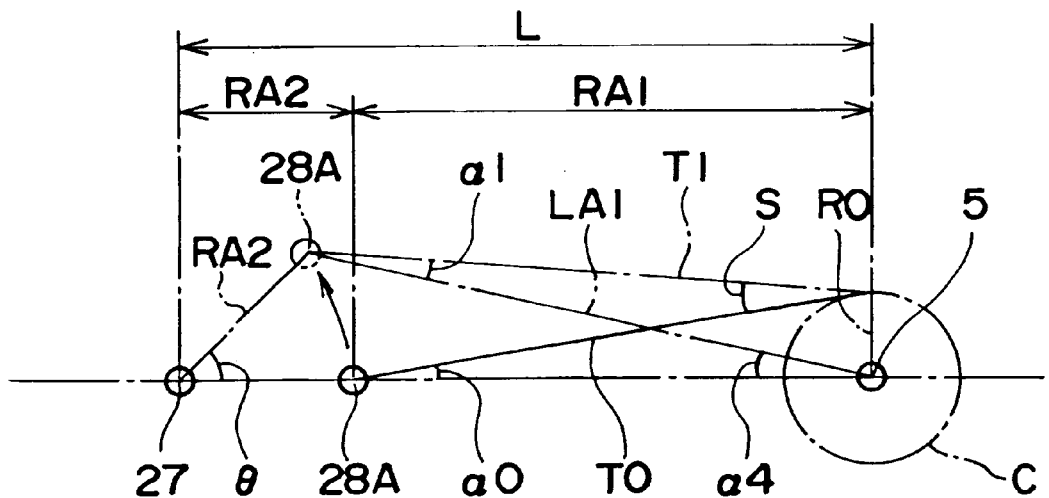
FIG. 5 is a schematic view illustrating the function of the first embodiment.

FIG. 5 is an enlarged-scale showing of the state of the probe 31 having swung in the direction D as shown in FIG. 4.

In the state of the first arm 141 having swung by angle S, the angle between tangential line T1 drawn from the axis of the transmitting pin 26A to the arc C of the radius R0 and the line LA1 drawn from the first shaft 5 of the axis of the transmitting pin 28A is shown as α1, and the angle between the line LA1 and the neutral line M is shown as α4.

In the neutral state of the first arm 141, the angle between the tangential line T0 drawn from the axis of the transmitting pin 28A on the neutral line M to the arc C of the radius R0 is shown as α0.

Figure 6:
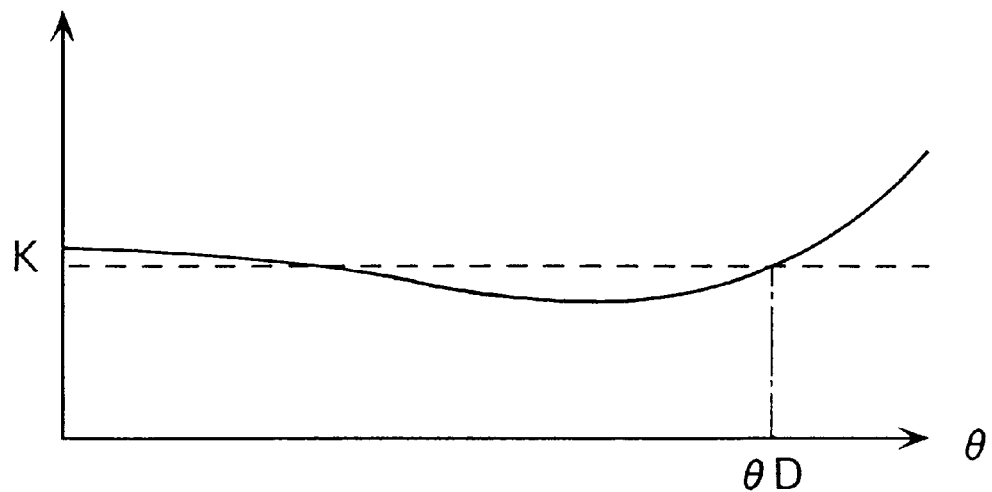
FIG. 6 is a graph showing the relation between swing angle θ of a second arm and magnification factor K in the first embodiment.

The angles α0, α1, α4, S and θ are related as $S = \alpha 0 + \alpha 4 - \alpha 1$ $RA2 \times \cos \theta + LA1 \times \cos \alpha 4 = L$ $RA2 \times \sin \theta = LA1 \times \sin \alpha 4$ $(L - RA2) \times \sin \alpha 0 = R0$ and $LA1 \times \sin \alpha 1 = R0$ FIG. 6 shows magnification factor K (θ/S) which is calculated by solving the above equations.

When the probe 31 is caused to swing in direction U in FIG. 4, the movable surface 41B which transmits the swing amount of the first arm 41 to the second arm 26, like the first arm 41 in the prior art mechanism, is substantially parallel with the neutral line M and is not the above inclined surface.

This is so because the transmitting pin 28B is found at a point to externally divide the line segment between the first and second shafts 5 and 27 spaced apart by inter-axis distance L to be RB1:RB2, it being thus possible to secure sufficient distance as RB1 and RB2 and reduce influence of the displacement n in the direction of the neutral Line M.

In addition, unlike the swinging in the direction D as described above, in the swinging in the direction U the first and second arms 14 and 26 swing in the same direction, so that their relative positions in the direction of the neutral line M are difficultly varied.

The first embodiment as described above has the following effects.

Figure 17:
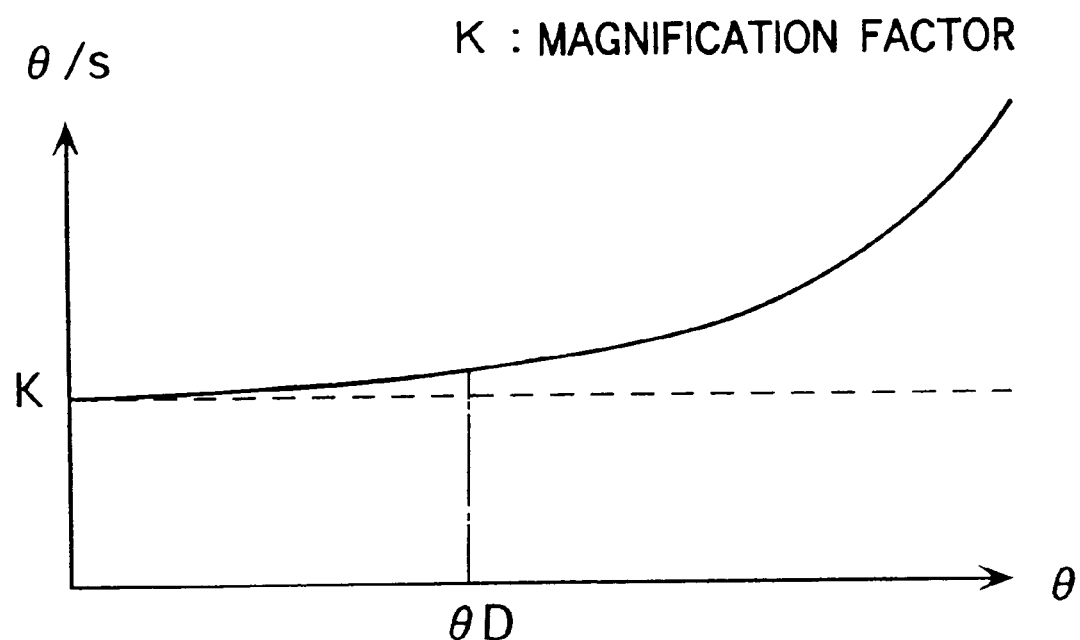
FIG. 17 is a graph showing the relation between swing angle θ of a second arm and magnification factor K in the prior art swing amount magnifying mechanism.

As is seen from the magnification factor as shown in FIG. 6 and that of the prior art mechanism as shown in FIG. 17, it is possible to stabilize the magnification factor K in a wide range of the swing angle θ from 0 to D by merely making the movable surface 11A of the first arm 141 to be an inclined surface. Thus, even a swing amount magnifying mechanism with a large swing amount range can make stable and highly accurate swing amount magnification.

In addition, such a highly accurate swing amount magnifying mechanism is obtainable by merely making the movable surface 141A of the first arm 41 to be an inclined surface and without need of specification changes of other components. It is thus possible to standardize the other components in the lever dial gauge manufacture, simplify the component management and reduce the cost of manufacture.

Figures 7, 8:
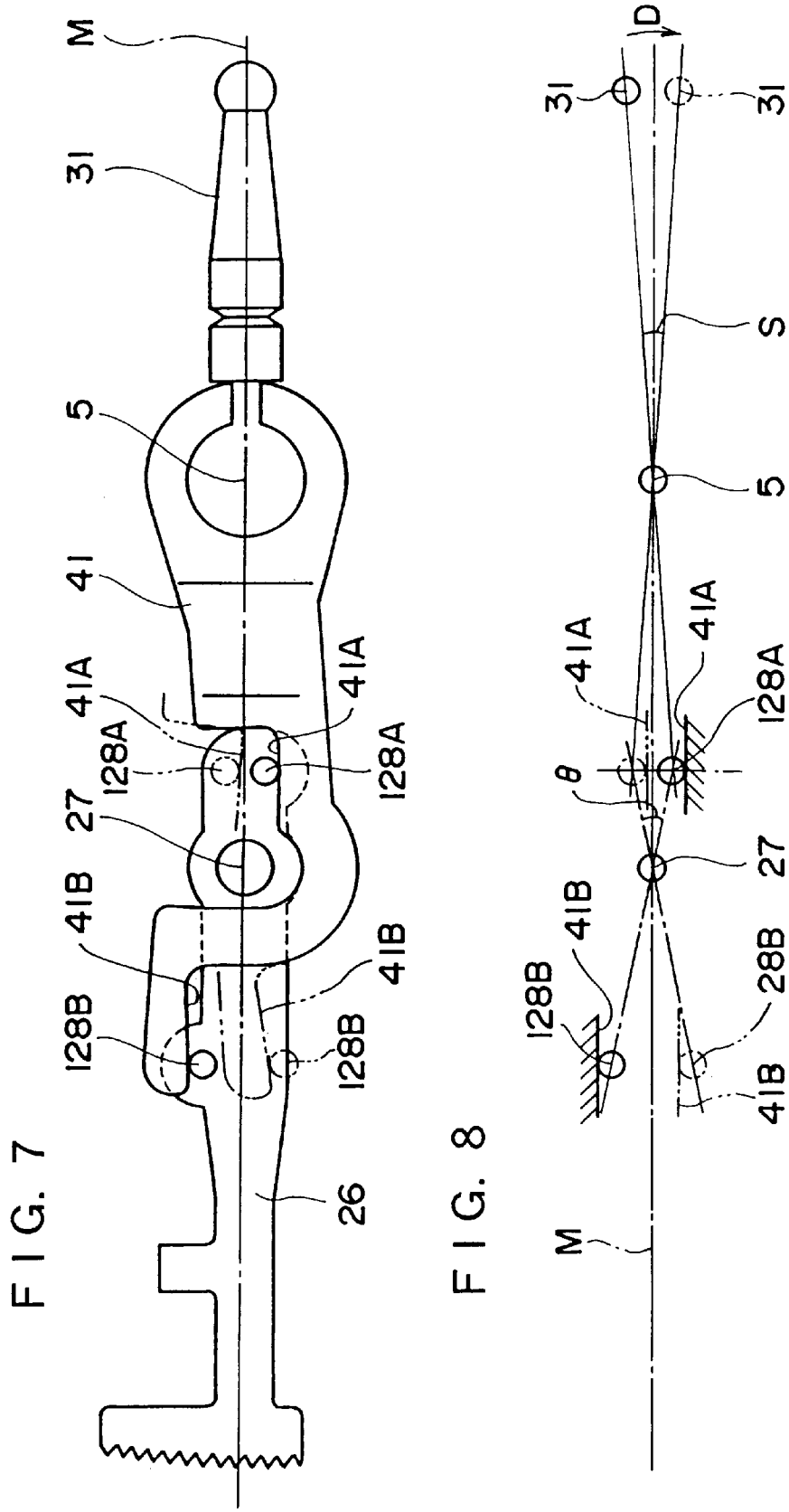
FIG. 7 is a schematic view showing the combination of a first arm and a second arm in a second embodiment of the swing amount magnifying mechanism according to the invention.
FIG. 8 is a schematic view illustrating displacements of movable surfaces and transmitting pins shown in FIG. 7.

FIGS. 7 and 8 show a second embodiment of the swing amount magnifying mechanism according to the invention. This embodiment is different from the prior art swing amount magnifying mechanism in the position of the transmitting pin provided on the second arm in the neutral state of the first arm.

In the prior art mechanism, the transmitting pin 28A of the second arm 26 is found on the neutral line M in the neutral state of the first arm 41. In this embodiment, the transmitting pin 128A of the second arm 126 is found at a position deviated from the neutral line M, and its position below the neutral line M in FIG. 7 is set as an initial position.

With the position of the transmitting pin 128A deviated from the neutral line M set as the initial position in the neutral state of the first arm 41, even when the first arm 41 is caused to swing in direction D in FIG. 8, the transmitting pin 128A is displaced such as to cross the neutral line M for enlarging the swing angle to θ.

Thus, the transmitting pin 128B is not greatly displaced in the direction of the neutral line M, and even a great change in the swing angle θ of the second arm 126 does not result in a great change in the magnification factor K (θ/S) (see FIG. 9). It is thus possible, like the first embodiment, to obtain accuracy improvement of the swing amount magnifying mechanism for a lever dial gauge.

In addition, in lever dial gauge manufacture, the accuracy improvement is obtainable by changing the position of the transmitting pin 128A of the second arm 126. It is thus possible to simplify the component management and reduce the cost of manufacture.

FIG. 10 shows a third embodiment of the swing amount magnifying mechanism according to the invention. In this embodiment of the swing amount magnifying mechanism, the features of the previous first and second embodiments are combined.

In this embodiment, in the neutral state of the first arm 241 the movable surface 241A of the first arm 241 is inclined such that it is parallel with a tangential line T0 drawn from the axis of the transmitting pin 28A to arc C of radius R0, which has its center constituted by the first shaft 5, and the transmitting pin 228A of the second arm 226 is found at a position deviated from the neutral line M.

Figure 12:
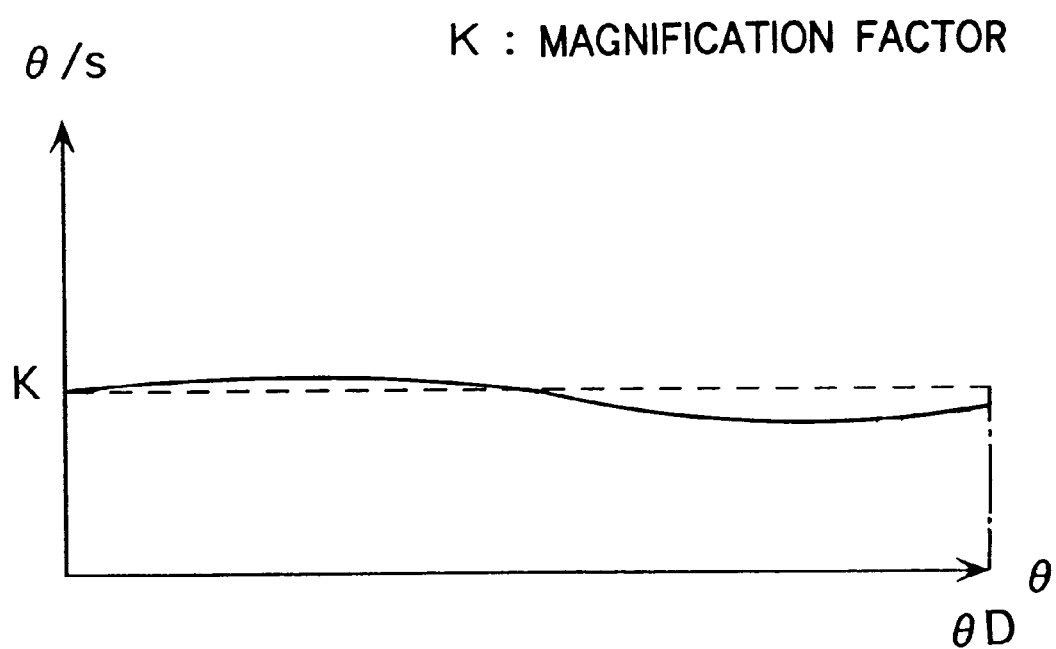
FIG. 12 is a graph showing the relation between swing angle θ of a second arm and magnification factor K in the third embodiment.

With the third embodiment of the swing amount magnifying mechanism, it is thus possible to obtain the effects obtainable with the previous first and second embodiments, stabilize the magnification factor K in a very side range of the swing angle θ (see FIG. 12), and further improve the accuracy of the swing amount magnifying mechanism.

In the third embodiment, when the first arm is caused to swing in direction U in FIG. 11, the movable surface 41 B of the first arm 241 is inclined with respect to the neutral line M, and the transmitting pin 228B of the second arm 226 is at its initial position above the neutral line M in FIG. 10.

EXAMPLES

Results of error measurements, which were conducted by assembling the first and second arms in the first to third embodiments in the prior art lever dial gauge, will now be described.

Conditions of measurement in the first to third embodiment and the prior art swing amount magnifying mechanism are shown in Table 1.

In the conditions of measurement shown in Table 1, the first and second arms 41 and 26 described in the prior art are used in the prior art mechanism, the first arm 141 is used instead of the first arm 41 in the first embodiment, the second arm 126 is used instead of the second arm 26 in the second embodiment, and the first and second arms 241 and 226 are used instead of the first and second arms 41 and 26, respectively, in the third embodiment.

The error measurement was done with two reference swing amount ranges of the first arm, i.e., 1.5 and 2.0 mm, and with the first and third embodiments the inclination of the movable surface was set on the basis of corresponding arm shift radii.

As for the casing, pinion gear and other components other than the first and second arms, the specifications were not changed for impartial accuracy judgment of the arms. In Table 1, the probe radius is the distance from the

TABLE 1

| Mechanism | 1-st embodiment | | 2-nd embodiment | | 3-rd embodiment | | Prior art | |
| --- | --- | --- | --- | --- | --- | --- | --- | --- |
| Measurement range (mm) | 1.5 | 2.0 | 1.5 | 2.0 | 1.5 | 2.0 | 1.5 | 2.0 |
| Arm shift radius R0 (mm) | 1.15 | 1.4 | 0 | 0 | 1.15 | 1.4 | 0 | 0 |
| Center pinion teeth number | 12 | 12 | 12 | 12 | 12 | 12 | 12 | 12 |
| Crown gear teeth number | 80 | 80 | 80 | 80 | 80 | 80 | 80 | 80 |
| Intermediate pinion teeth number | 19 | 19 | 19 | 19 | 19 | 19 | 19 | 19 |

TABLE 1-continued

| Mechanism | 1-st embodiment | | 2-nd embodiment | | 3-rd embodiment | | Prior art | |
|---|---|---|---|---|---|---|---|---|
| Sector gear teeth number | 272 | 272 | 272 | 272 | 272 | 272 | 272 | 272 |
| Inter-axis distance L (mm) | 14 | 14 | 14 | 14 | 14 | 14 | 14 | 14 |
| Transmitting pin position radius RA2 (mm) | 3.562 | 3.562 | 3.562 | 3.562 | 3.562 | 3.562 | 3.562 | 3.562 |
| Transmitting pin position ratius RB2 (mm) | 7.253 | 7.253 | 7.253 | 7.253 | 7.253 | 7.253 | 7.253 | 7.253 |
| Probe radius (mm) | 22.24 | 22.24 | 22.24 | 22.24 | 22.24 | 22.24 | 22.24 | 22.24 |
| One pointer rotation measurement range (mm) | 0.5 | 0.5 | 0.5 | 0.5 | 0.5 | 0.5 | 0.5 | 0.5 |
| Start angle (deg.) | 0 | 0 | 5.658 | 7.5441 | 1.14 | 2.5 | 0 | 0 |
| Theoretical start angle (deg.) | 5.6581 | 7.5441 | 5.6581 | 7.5441 | 5.6581 | 7.5441 | 5.6581 | 7.5441 | first shaft with the first arm secured thereto to the free end of the probe 31.

Figure 14:
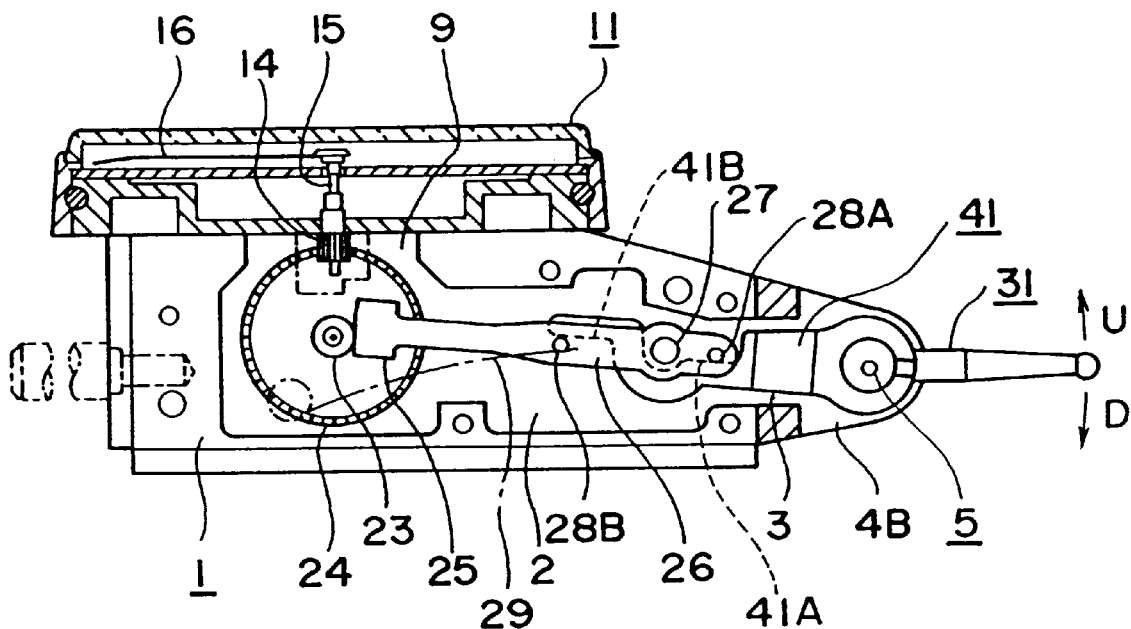
FIG. 14 is a view showing the internal construction of the dial gauge with the prior art swing amount magnifying mechanism.

Table 2 shows the results of the error measurement. In table 2, D direction means swinging of the probe 31 in the direction D in FIG. 14, and U direction means swinging of the probe 31 in the direction U.

TABLE 2

| | D direction error measurement width | | U direction error measurement width | |
|---|---|---|---|---|
| Measurement range (mm) | 1.5 | 2.0 | 1.5 | 2.0 |
| 1-st embodiment (mm) | 0.0038 | 0.01132 | 0.0033 | 0.00683 |
| 2-nd embodiment (mm) | 0.00681 | 0.01501 | 0.00177 | 0.00318 |
| 3-rd embodiment (mm) | 0.00248 | 0.00489 | 0.0274 | 0.00481 |
| Prior art mechanism (mm) | 0.02303 | 0.053 | 0.0033 | 0.00688 |

As is seen from Table 2, with the first to third embodiments, the accuracy of the swing amount magnifying mechanism is improved compared to the prior art mechanism, and particularly the accuracy is improved with respect to the direction D.

In the first embodiment, the accuracy of measurement is not improved in the U direction error measurement because the movable surface 41B of the first arm 141 in FIG. 2 is not altered.

The above embodiments of the invention are by no means limitative, and the following modifications are possible.

In the above embodiments, the accuracy of the swing amount magnifying mechanism was improved with respect to the D direction error measurement by altering the movable surface 141A and the transmitting pin 28A. However, this is by no means limitative, and it is possible to alter the movable surface 41B as the transmitting pin 28B with respect to the direction D to improve the accuracy of the swing amount magnifying mechanism with respect to this direction.

For example, in the second embodiment the initial position of the transmitting pin 128B is above the neutral line M as shown in FIG. 7. With this arrangement, the accuracy is improved compared to the prior art mechanism in the U direction error measurement as shown in Table 2.

In the third embodiment, like the second embodiment, the accuracy is improved compared to the prior art by providing the movable surface 241B as an inclined surface and setting the initial position of the transmitting pin 228B to be above the neutral line M.

In the above embodiments, the distances RA2 and RA1 in FIG. 4 were set to be RA2<RA1<L to provide means for magnifying the swing angle S of the first arm 141 into the swing angle θ of the second arm 26. However, this is by no means limitative. For example, it is possible to set a relation RA1<RA2<L to provide means for contraction converting the swing angle S of the first arm 141 into the swing angle θ of the second arm 26. This arrangement may, for instance, be utilized for a small displacement generating mechanism for precision measuring instrument calibration.

In the above embodiments, the movable surfaces 141A and 141B are provided on the first arm 141 as the magnified side while providing the transmitting pins 28A and 28B on the second arm 26 as the magnifying side. However, this is by no means limitaive. For example, it is possible to provide transmitting pins on the first arm as the magnified side and provide movable surfaces on the second arm as the magnifying side.

The above embodiments concerned with a two-lever magnifying mechanism using the first and second arms in combination. However, this is by no means limitative, and the invention is applicable as well to a magnifying mechanism with a combination of three or more levers.

In the above embodiments, the probe 31 detected a swing amount. However, this is by no means limitative. For example, the magnifying mechanism according to the invention is applicable to a dial gauge, in which a spindle stroke, for instance, is converted to a corresponding rotation amount of a pointer. In general, the effects of the invention are obtainable when the invention is applied to a magnifying mechanism for magnification converting a measured side via a plurality of levers.

Further changes and modifications of the embodiments of the invention may be made without departing from the scope of the invention.

What is claimed is:

1. A swing amount magnifying mechanism comprising a first shaft and a second shaft, these shafts having the axes thereof extending in the same direction, a first arm pivotally mounted on the first shaft, and a second arm pivotally mounted on the second shaft and disposed adjacent to the first arm, the first or second arm having a movable surface to be disposed with swinging of that arm, the other arm than that with the movable surface having a transmitting pin in contact with the movable surface for transmitting swinging of the arm with the movable surface to the other arm, swinging of the first arm causing rotation of the second arm via the transmitting pin, a swing angle of the first arm being magnification converted to be transmitted to the second arm, wherein in an initial state the movable surface is inclined with respect to a neutral line connecting the first and second shafts and gradually further apart from the neutral line as one goes from the first shaft to the second shaft.

2. The swing amount magnifying mechanism according to claim 1, wherein the inclination of the movable surface of the first arm is parallel to a tangential line drawn from the axis of the transmitting pin of the second arm to an arc, which has its center constituted by the axis of the first shaft and a radius determined in dependence on the swing amount range of the first arm.

3. The swing amount magnifying mechanism according to claim 1, wherein when the first and second arms are found on the neutral line, the transmitting pin is found at a position deviated from the neutral line.

4. The swing amount magnifying mechanism according to claim 2, wherein when the first and second arms are found on the neutral line, the transmitting pin is found at a position deviated from the neutral line.

5. The swing amount magnifying mechanism according to claim 1, which is used as a magnifying mechanism for a lever dial gauge for measuring a step of an object under measurement.

6. The swing amount magnifying mechanism according to claim 2, which is used as a magnifying mechanism for a lever dial gauge for measuring a step of an object under measurement.

7. The swing amount magnifying mechanism according to claim 3, which is used as a magnifying mechanism for a lever dial gauge for measuring a step of an object under measurement.

8. The swing amount magnifying mechanism according to claim 4, which is used as a magnifying mechanism for a lever dial gauge for measuring a step of an object under measurement.

9. A swing amount magnifying mechanism comprising a first shaft and a second shaft, these shafts having the axes thereof extending in the same direction, a first arm pivotally mounted on the first shaft, and a second arm pivotally mounted on the second portion and disposed adjacent to the first arm, the first or second arm having a movable surface to be displaced with switching of that arm, the other arm than that with the movable surface having a transmitting pin in contact with the movable surface for transmitting switching of the arm with the movable surface to the other arm, swinging of the first arm causing rotation of the second arm via the transmitting pin, a swing angle of the first arm being magnification converted to be transmitted to the second arm, wherein when the first and second arms are found on a neutral line connecting the first and second shafts, the transmitting pin is found at a position deviated from the neutral line.

10. The swing amount magnifying mechanism according to claim 9, wherein the movable surface is substantially parallel with the neutral line.

11. The swing amount magnifying mechanism according to claim 9, which is used as a magnifying mechanism for a lever dial gauge for measuring a step in an object under measurement.

12. The swing amount magnifying mechanism according to claim 10, which is used as a magnifying mechanism for a lever dial gauge for measuring a step in an object under measurement.

* * * * *